(12) United States Patent
Kuo et al.

(10) Patent No.: US 7,444,428 B1
(45) Date of Patent: Oct. 28, 2008

(54) METHOD AND APPARATUS FOR ESTIMATING RELATIVE NETWORK PROXIMITY IN THE PRESENCE OF A NETWORK FILTER

(75) Inventors: Szu-Wen Kuo, Milpitas, CA (US); Mehul S. Shah, Campbell, CA (US); J Eric Mowat, Piedmont, CA (US)

(73) Assignee: NetApp, Inc., Sunnyvale, CA (US)

( * ) Notice: Subject to any disclaimer, the term of this patent is extended or adjusted under 35 U.S.C. 154(b) by 1172 days.

(21) Appl. No.: 10/228,638

(22) Filed: Aug. 26, 2002

(51) Int. Cl.
| | |
|---|---|
| *G06F 15/173* | (2006.01) |
| *G01R 31/08* | (2006.01) |
| *G06F 11/00* | (2006.01) |
| *G08C 15/00* | (2006.01) |
| *H04J 1/16* | (2006.01) |

(52) U.S. Cl. .................. 709/242; 709/223; 709/224; 709/238; 709/239; 709/240; 709/241; 370/241; 370/249; 370/351

(58) Field of Classification Search .............. 370/351, 370/241, 249; 709/223–224, 238–242
See application file for complete search history.

(56) References Cited

U.S. PATENT DOCUMENTS

| | | | |
|---|---|---|---|
| 6,778,524 B1* | 8/2004 | Augart .................. | 370/351 |
| 6,826,172 B1* | 11/2004 | Augart .................. | 370/351 |
| 6,829,642 B1* | 12/2004 | Giroir et al. ............ | 709/225 |
| 2002/0073199 A1* | 6/2002 | Levine et al. ............ | 709/225 |
| 2002/0141343 A1* | 10/2002 | Bays .................... | 370/235 |
| 2002/0143991 A1* | 10/2002 | Chow et al. ............. | 709/245 |
| 2003/0110274 A1* | 6/2003 | Pazi et al. .............. | 709/229 |
| 2003/0204619 A1* | 10/2003 | Bays .................... | 709/238 |
| 2004/0054805 A1* | 3/2004 | Sen et al. ............... | 709/240 |

\* cited by examiner

*Primary Examiner*—Bunjob Jareonchonwanit
*Assistant Examiner*—Philip J Chea
(74) *Attorney, Agent, or Firm*—Perkins Coie LLP

(57) ABSTRACT

A method and apparatus for estimating relative network proximity between request routing agents and client agents are described herein. In one embodiment, the method includes a proximity estimation unit to send a first number of probe messages to a client agent without waiting to receive a reply message, wherein the proximity estimation unit is to receive a first set of reply messages. The apparatus also including a proximity verification unit coupled with the proximity estimation unit, to send a second number of probe messages to the client agent, and to receive a second set of reply messages.

30 Claims, 11 Drawing Sheets

METHOD AND APPARATUS FOR ESTIMATING RELATIVE NETWORK PROXIMITY IN THE PRESENCE OF A NETWORK FILTER

FIELD OF THE INVENTION

The present invention pertains to networking. More particularly, the present invention relates to determining the proximity between network elements.

BACKGROUND OF THE INVENTION

A content delivery network (CDN) is a geographically distributed network for delivering network content. Network content can include images, text, sound, software, and numerous other types of electronic data. CDNs can include request routing servers and request routing agents positioned at various locations around the world. The request routing servers and agents work together to provide network content for clients. Request routing servers and agents are typically used for increasing the speed with which clients receive requested network content. In certain network configurations, when a client requests network content, a request routing server provides the Internet Protocol (IP) address of the nearest request routing agent that is able to serve the content. Using the IP address, the client requests the content from the nearby request routing agent.

CDNs rely on network proximity measurements (network proximity is a measure of temporal proximity or latency) to route content requests to the closest request routing agents. Network proximity is often actively measured. When proximity is actively measured, a request routing agent typically sends probe messages to a client agent. In response to receiving the probe messages, the client agent typically sends reply messages back to the request routing agent. Proximity is measured from the delay between when the request routing agent sends a probe message and when it receives a reply to the probe message. Based on this message exchange, a request routing agent can estimate its proximity to the client agent. Request routing agents report these proximity estimates to the request routing servers, so the request routing servers can determine which request routing agents are nearest to certain client agents.

A large number of enterprises and Internet service providers deploy layer filters (e.g., firewalls) to prevent unwanted intrusions. A side effect of this is that active probe messages between the request routing agent and the client agent are blocked (e.g., layer filters may not forward some probe messages to their destination; thus dropping or discarding the probe message). When the probe message does not reach the client's agent, the request routing agent cannot estimate proximity between itself and the client's agent. When no proximity measurement is reported to the request routing agent, the request routing agent is unable to report proximity information to the request routing server, which in turn cannot accurately redirect the client to the closest cache.

SUMMARY OF THE INVENTION

The present invention includes a method and apparatus for estimating relative network proximity between request routing agents and client agents. In one embodiment, the method includes a proximity estimation unit to send a first number of probe messages to a client agent without waiting to receive a reply message, wherein the proximity estimation unit is to receive a first set of reply messages. The apparatus also including a proximity verification unit coupled with the proximity estimation unit, to send a second number of probe messages to the client agent, and to receive a second set of reply messages.

BRIEF DESCRIPTION OF THE DRAWINGS

The present invention is illustrated by way of example and not limitation in the Figures of the accompanying drawings, in which like references indicate similar elements and in which.

DETAILED DESCRIPTION

A method and apparatus for estimating relative network proximity between request routing agents and client agents are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

Herein, block diagrams illustrate exemplary embodiments of the invention. Also herein, flow diagrams illustrate operations of the exemplary embodiments of the invention. The operations of the flow diagrams will be described with references to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

Overview

In one embodiment of the invention, a request routing agent determines its proximity to a client agent by sending probe messages to network elements located along the path between the request routing agent and the client agent. As network elements along the path receive these messages, they send reply messages back to the request routing agent. These reply messages indicate how far away the network elements are from the request routing agent (e.g. the messages indicate how many "hops" away the network elements are from the request routing agent and the time taken for the reply or reach the request routing agent). Based on the distance indicated in the reply messages, the request routing agent determines its proximity to a client agent.

Exemplary Architecture

Figure 1:
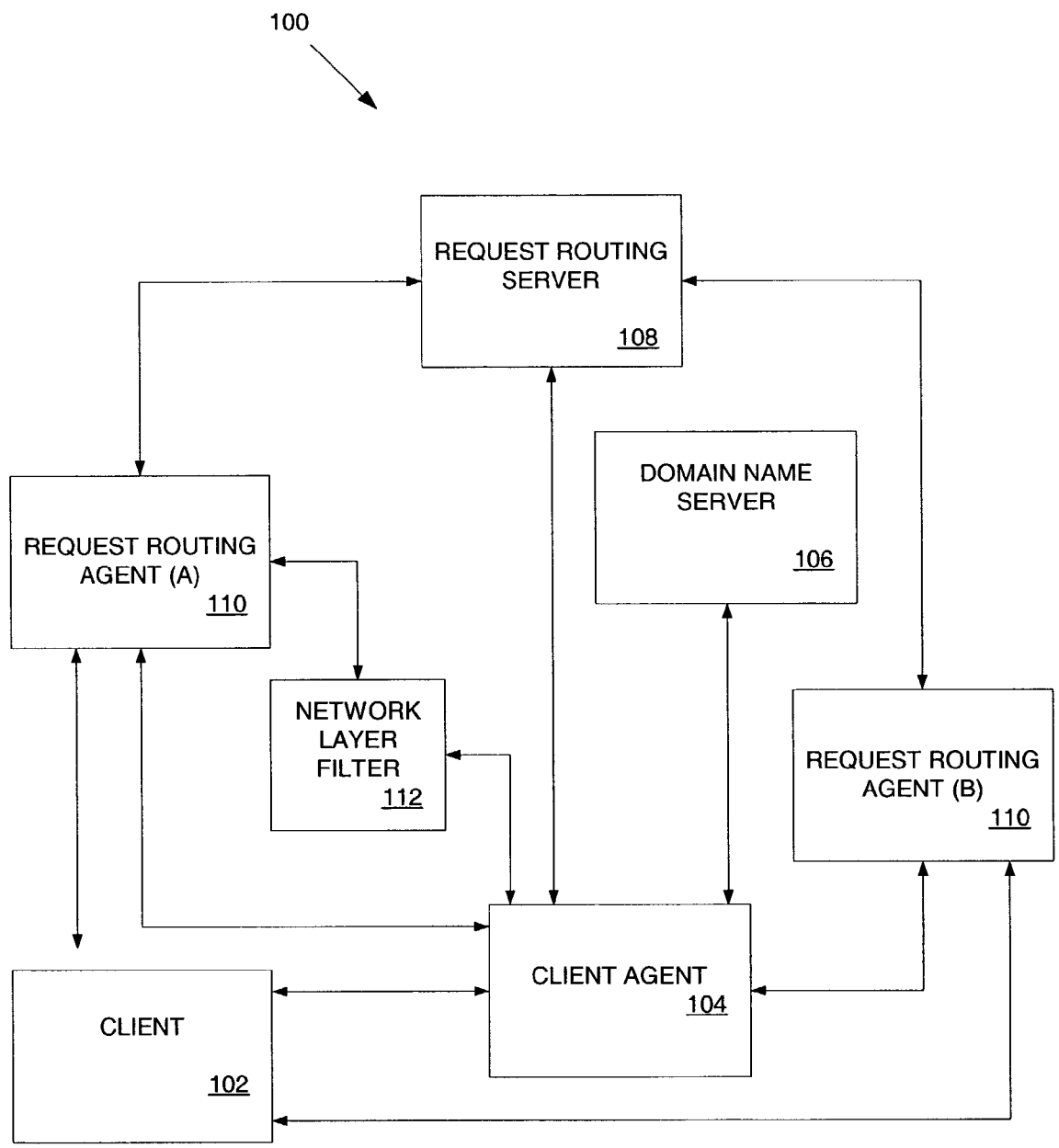
FIG. 1 is a block diagram illustrating a content delivery network.

FIG. 1 is a block diagram illustrating a content delivery network. In FIG. 1, a content delivery network (CDN) 100 includes a client 102 connected to a client agent 104. In certain embodiments, the client agent is a local domain name server (LDNS). The client agent 104 is also connected to a domain name server (DNS) 106, request routing agents 110, and a request routing server 108. The request routing agents 110 serve content for a set of domain names. The request routing server 108 stores locations of the request routing agents 110 (e.g., IP addresses of the request routing agents 110). The request routing server 108 is connected to the request routing agents 110 (individually labeled as request routing agent (A) and request routing agent (B)). The request routing agents 110 are connected to the client 102 and the client agent 104. Request routing agent (A) is connected to a network layer filter 112, which is connected to the client agent 104. In an alternative embodiment the network layer filter 112 is contained within the client agent 104. In one embodiment, the CDN components are directly connected, while in an alternative embodiment, the components are indirectly connected. That is, there may be one or more network elements situated between CDN components (e.g., there may be a number of routers between the client 102 and the client agent 104). Herein, network elements are routers, local domain name servers, domain name servers, clients, etc.

In the exemplary embodiments shown in FIG. 1, the CDN 100 includes two request routing agents 110, one request routing server 108, one client 102, one DNS 106, one client agent 104, and one network layer filter 112. However in alternative embodiments, there are greater or fewer numbers of these components.

Certain of the components shown in FIG. 1, along with their operations, will be described in the following paragraphs. In particular, the discussion of FIG. 2 will further describe the CDN. FIGS. 3 and 4 will describe methods for determining proximity between network elements. These Figures will be introduced and discussed in their numerical order with numerous references back to previously introduced Figures (e.g., the discussion of FIG. 3 will refer to material presented in the discussion of FIG. 2).

Figure 2:
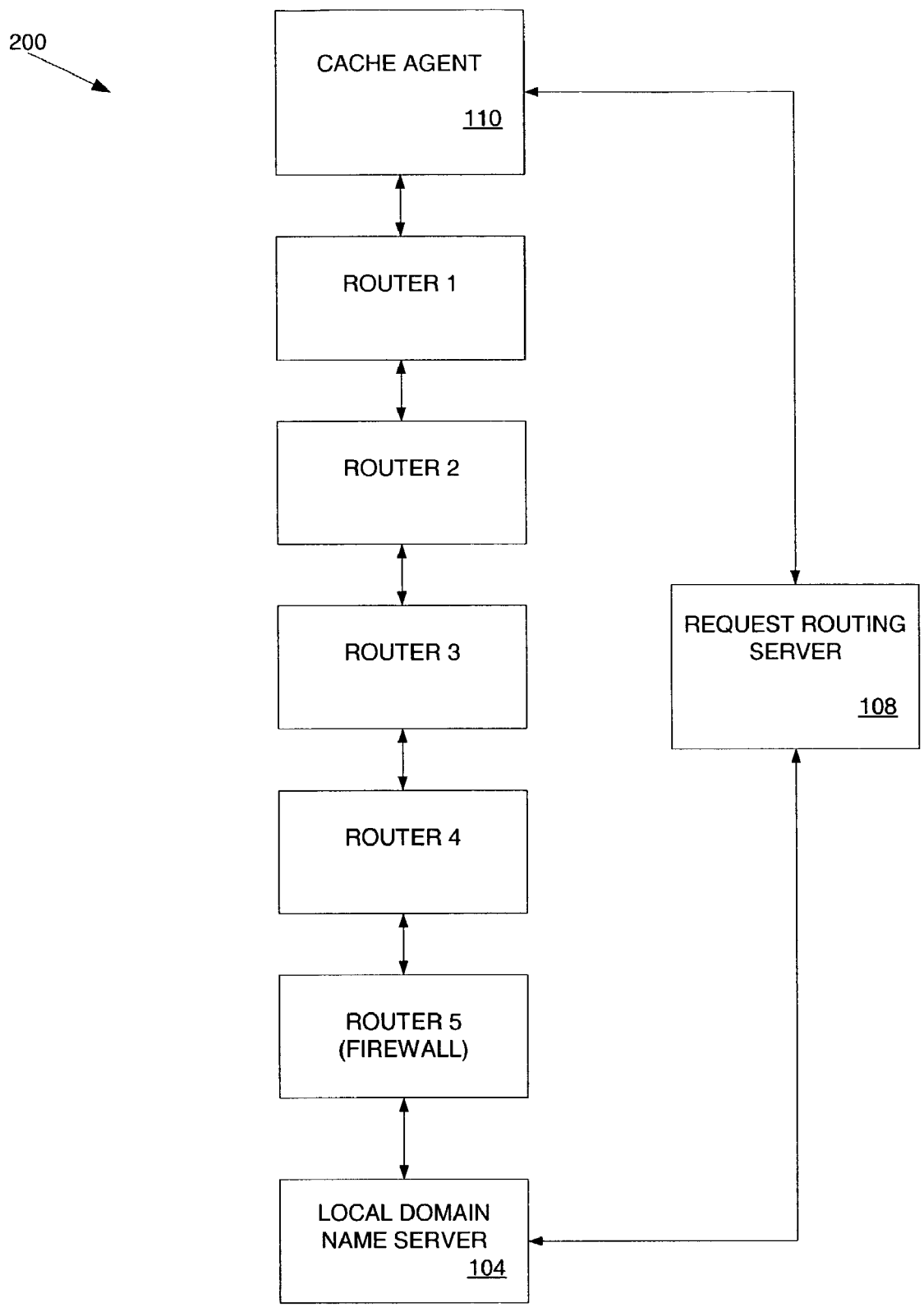
FIG. 2 is a block diagram illustrating a segment of a content delivery network, according to embodiments of the invention.
Figure 3:
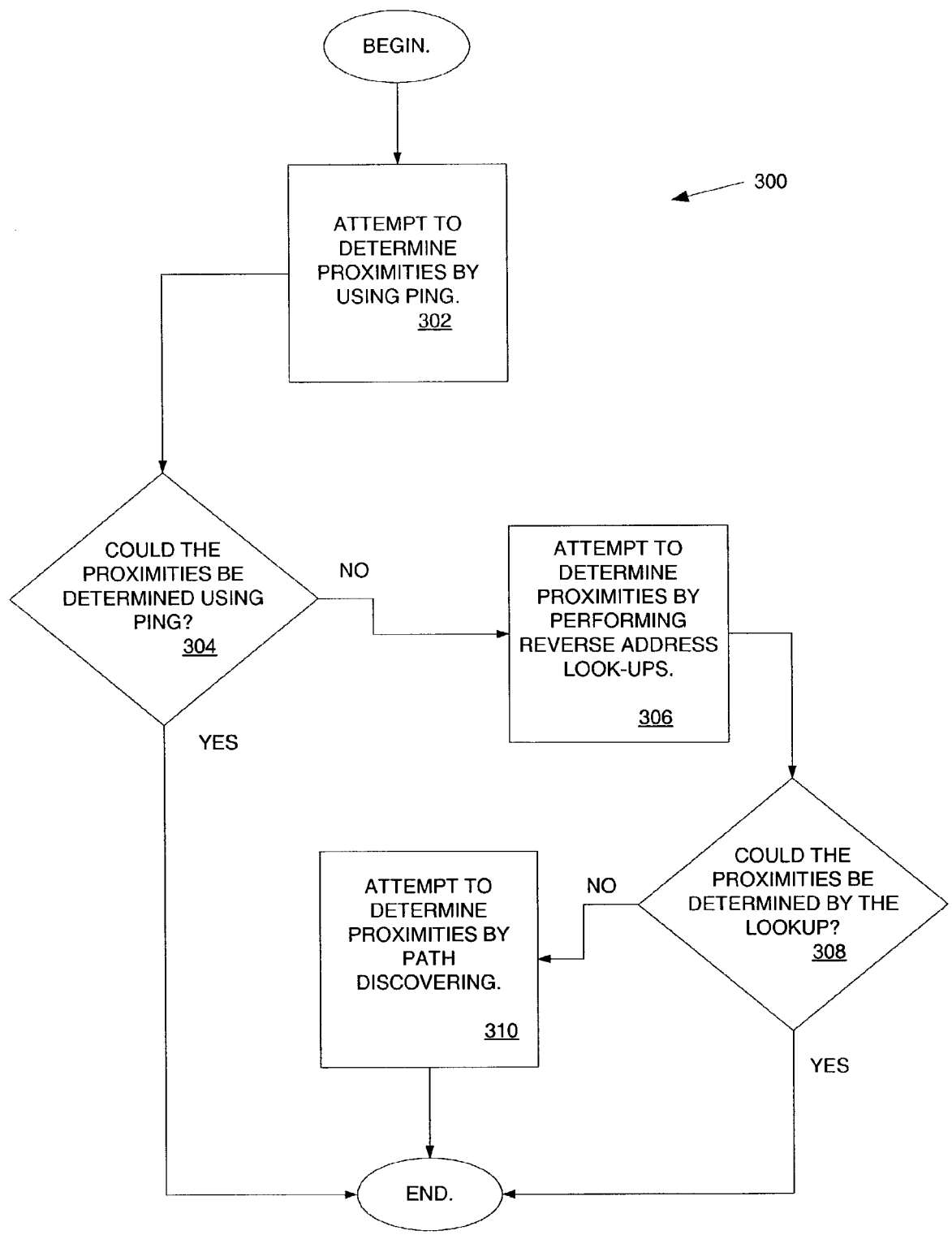
FIG. 3 is a flow diagram illustrating operations of a content delivery network, according to embodiments of the invention.

FIG. 2 is a block diagram illustrating a segment of a CDN, according to embodiments of the invention. As shown in FIG. 2, the CDN segment 200 includes a request routing server 108, a request routing agent 110, and a client agent 104. The request routing server 108 is connected to the request routing agent 110 and the client agent 104. In one embodiment, the request routing server 108 is directly connected to the request routing agent 110 and the client agent 104. In alternative embodiment, the request routing server 108 is indirectly connected to the request routing agent and the client agent 104. For example, there are a number of network elements (e.g. routers) between the request routing server 108, request routing agent 110, and client agent 104.

As shown in FIG. 2, the request routing agent 110 and client agent 104 are connected by a series of routers (individually labeled as routers 1-5). That is, the request routing agent 110 is connected to the first router of the series (router 1), all the routers of the series are connected (routers 1-5), and the client agent 104 is connected to the last router of the series (router 5). The request routing agent 110 can communicate with the client agent 104 by sending messages through the series of routers. For example, a message from the request routing agent 110 would be forwarded to router 1, then to router 2, and so on, eventually reaching the client agent 104. Router 5 contains a firewall, which causes router 5 to drop certain messages destined for the client agent 104. For example, router 5 may not forward probe messages to the client agent 104.

Operations of the request routing agent 110 and request routing server 108 will now be described in more detail. As indicated in the description of FIG. 1, the request routing server 108 stores locations of the request routing agents 110 (e.g., IP addresses). The request routing server 108 also tracks which request routing agents 110 are closest to particular client agents 104. In one embodiment, the request routing server 108 transmits probe requests to the request routing agents 110. In response to the probe requests, the request routing agents 110 determine their proximity to certain client agents 104 by sending a number of probe messages to the client agents. In response to receiving the request routing agent probe messages, the client agents 104 return reply messages back to the request routing agents 110. Based on the reply messages, the request routing agents 110 determine their proximity to the client agents. After determining their proximities to client agents, the request routing agents 110 report the proximities to the request routing server 108, which stores them in a table or other structure. For example, in one embodiment, a request routing server table indicates the content contained at each request routing agent 110 and the proximity of each request routing agent 110 to each client agent 104.

FIG. 3 is a flow diagram illustrating operations for determining the proximity of network elements. The operations of the flow diagram of FIG. 3 will be described with reference to the exemplary CDN segment of FIG. 2. As shown in FIG. 3, the flow diagram 300 commences at block 302, wherein request routing agents 110 attempt to determine proximities between themselves and client agents 104 by using "ping" messages (i.e. by sending Internet Control Message Protocol echo requests). For example, a request routing agent 110 exchanges ping messages (e.g., Internet Control Message Protocol echo and reply messages) with a client agent 104. In one embodiment, the client agent is a local domain name server. The request routing agent 110 determines its proximity to a client agent 110 based on information included in the ping reply messages (e.g., the time a reply was sent from an LDNS). The process continues at block 304.

At block 304, a request routing server 108 determines whether proximities could be determined using the ping technique. If proximity could not be determined using ping, the process continues at block 306. Otherwise the process ends. In one embodiment, the requesting routing agent determines whether a different probing technique should be used (e.g., whether the probing technique should be reverse client lookups). This determination is in response to request routing agents reporting that proximities cannot be determined using the current probing method. In one embodiment, the request routing server decides to try a new method after all request routing agents have reported their network proximity estimates or five minutes have elapsed. In one embodiment, when the probing technique calls for using ping messages, at least a single valid measurement from a request routing agent is required to consider the probing method useful (i.e., to continue using the ping probing method).

At block 306, request routing agents 110 attempt to determine proximities by performing reverse address lookups. The operations for performing the reverse address lookups are described in more detail below in the description of FIG. 9. In one embodiment, the reverse address lookups are reverse DNS lookups performed by an LDNS. The process continues at block 308. At block 308, the request routing server 108 determines whether the proximities could be determined by performing reverse address lookups. If proximities could be determined by performing reverse address lookups, the process ends. Otherwise, the process continues at block 310. In one embodiment, the request routing server 108 requires at least one valid proximity measurement from a request routing agent to continue using the reverse address lookup probing technique.

As shown in block 310, the request routing agent 110 determines proximities by discovering paths between sources and destinations (hereinafter referred to as the discovering paths method). In one embodiment, for this probing technique, at least three request routing agents (or the total number of routing agents, whichever is smaller) must report the same last_hop information (last_hop is described below in greater detail) to consider the probing technique useful. In one embodiment, if this condition is not met, the request routing agents do not attempt to determine proximities until further notified by request routing servers. Operations for determining proximity by discovering paths between sources and destinations are described below in the descriptions of FIGS. 4-8. After performing the operation at block 310, the process ends.

Figure 4A:
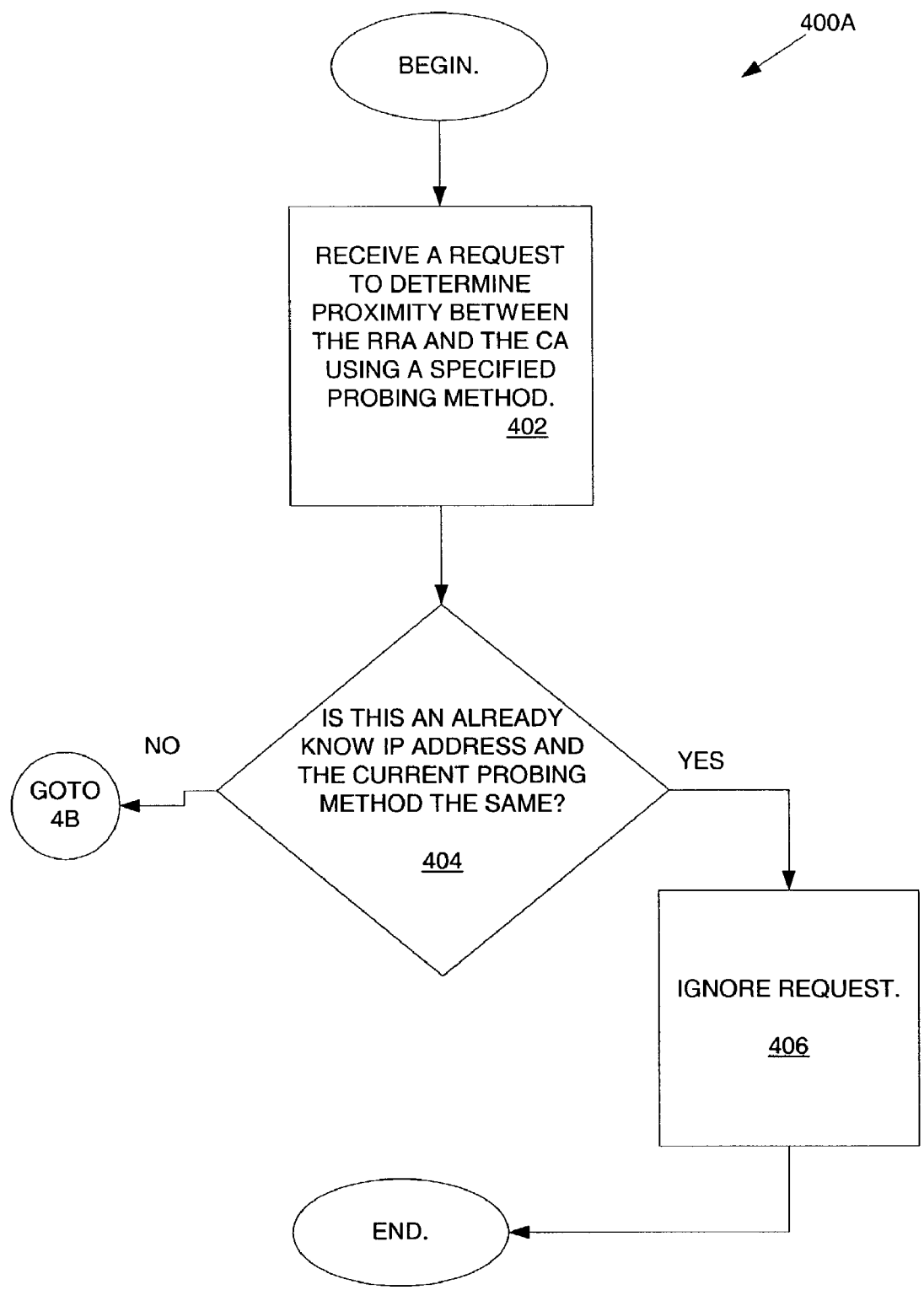
FIG. 4A is a flow diagram illustrating operations for determining the proximity of a request routing agent to a local domain name server, according to embodiments of the invention.

FIG. 4A is a flow diagram illustrating operations for determining the proximity of a request routing agent to a client agent by measuring routes, according to embodiments of the invention. The flow diagrams of FIGS. 4A and 4B will be described with reference to the exemplary CDN segment of FIG. 2. In FIG. 4A and other Figures, request routing agent is abbreviated as "R.R.A." Similarly, the request client agent is abbreviated as "C.A.". As shown in FIG. 4A, the flow diagram 400A commences at block 402, wherein a request routing agent 110 receives a request to determine its proximity to a client agent 104 using a particular probing method. The request includes the IP address of a particular client agent. In one embodiment, the request routing agent 110 receives the request from a request routing server 108. In one embodiment, the probing methods include using ping messages, performing reverse address lookups, and discovering paths, as described above in the discussion of FIG. 3. The process continues at block 404. At block 404, the request routing agent 110 determines whether the IP address is already known and the current probing method is the same. For example, the request routing agent 110 determines whether it has previously received and processed a proximity request for the client agent 104 located at the IP address. In one embodiment, the request routing agent 110 maintains a table of client agents for which it knows proximities. The table may also store additional data associated with the client agent proximity verifications. If the IP address is not already known, the process continues at block 408 of FIG. 4B. Otherwise the process continues at block 406. At block 406, the routing request agent 110 ignores the request. For example, the routing request agent 110 ignores the request because it has already determine the proximity for that IP address. From block 406, the process ends.

Figure 4B:
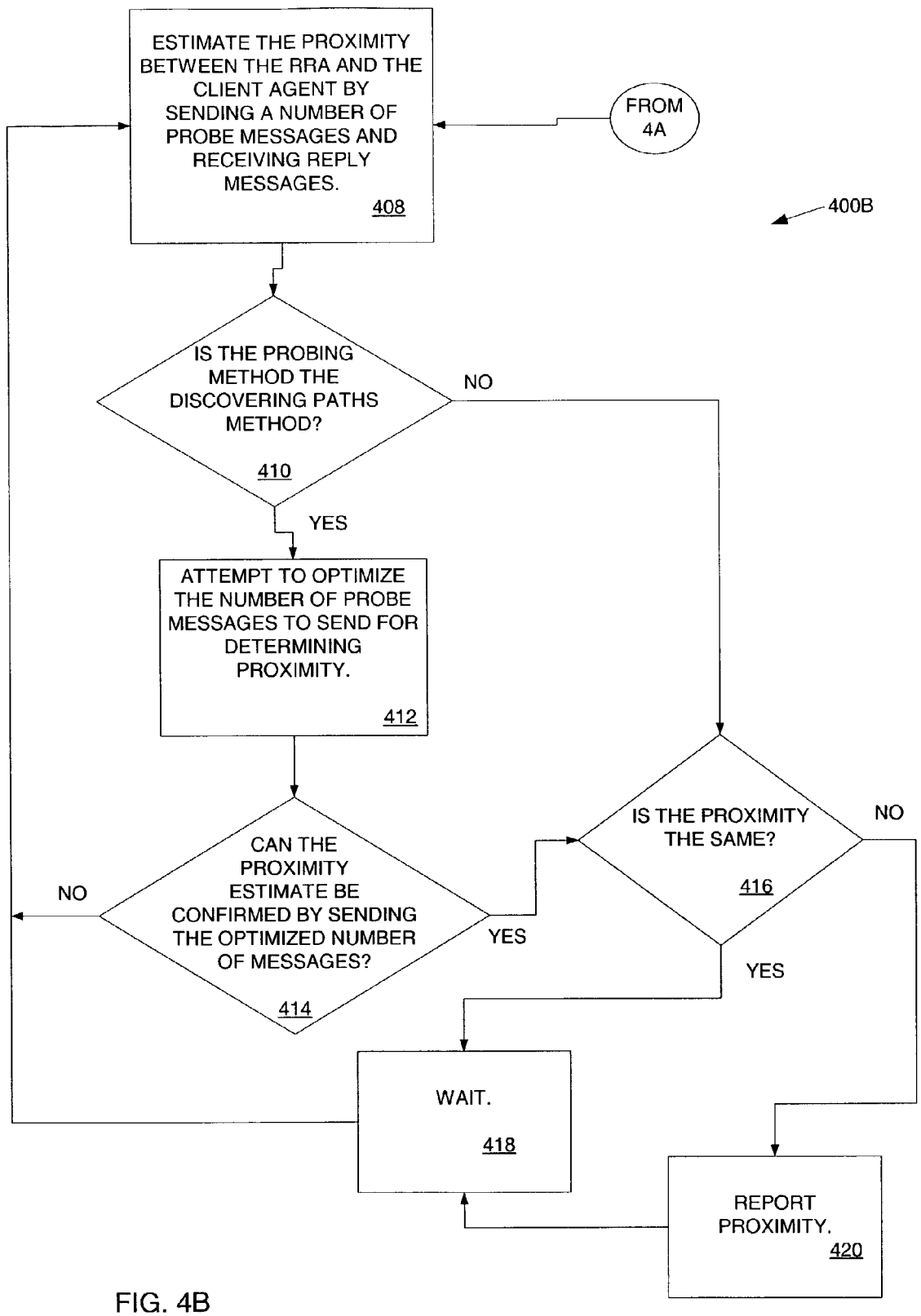
FIG. 4B is a flow diagram illustrating operations for determining the proximity of a request routing agent to a local domain name server, according to embodiments of the invention.

FIG. 4B is a flow diagram illustrating operations for determining the proximity of a request routing agent to a client agent by measuring routes, according to embodiments of the invention. At block 408, the request routing agent 110 estimates the proximity between itself and the client agent 104 by sending a number of probe messages and receiving a number of reply messages, according to the current probing technique. In one embodiment, the request routing agent 110 sends a number of messages to the client agent 104, but those messages do not reach the client agent 104 because they are dropped by the firewall of router 5. Since the probe messages only reach router 5, according to one probing method, the request routing agent 110 estimates its proximity to the client agent 104 based on reply messages received from router 5. The operations for sending and receiving probe and reply messages will be described in more detail below. The process continues at block 410.

At block 410, their request routing agent 110 determines whether the current probing method is the discovering paths method. If the current method is the discovering paths method, the process continues at block 412. Otherwise, the process continues at block 416. At block 412, the request routing agent 110 attempts to optimize the number of probe messages to send for determining the proximity. The operations for optimizing the number of probe messages for determining the proximity are described in greater detail below, in the description of FIG. 7. In one embodiment, the request routing agent 110 attempts to reduce the number of messages needed for determining the proximity. For example, in one embodiment, while the request routing agent 110 sends 30 messages when estimating the proximity (in block of 408), it attempts to reduce the number of probe messages needed for determining proximity from 30 to 3. However, the request routing agent 110 may reduce the number of probe messages to a number greater or lesser than 3. In one embodiment, the request routing agent 110 may increase the number of probe messages sent for determining proximity, as discussed in greater detail in the description of FIG. 7. For example, if the proximity cannot be verified below, the request routing agent 110 may increase the number of probe messages from 3 to 5. Alternatively, it may increase the number of probe messages from 5 to 7. Alternative embodiments of the invention may increase the number of probe messages by greater or lesser numbers. The process continues at block 414.

As shown in block 414, the request routing agent 110 determines whether the proximity estimate can be confirmed by sending an optimized number of messages. In one embodiment, the request routing agent 110 sends an optimized number of probe messages to the client agent 104. After sending the probe messages, the request routing agent 110 receives a number of reply messages. Based on the received reply messages, the request routing agent 110 attempts to confirm the proximity estimate (from block 408). If the proximity estimate can be confirmed by sending an optimized number of messages, the process continues at block of 416. Otherwise, the process continues at block 404. Sometimes the request routing agent 110 cannot confirm the proximity estimate because network elements (e.g., routers) erroneously process the probe messages. For example, a router may forward a probe message, but erroneously decrement the message's time to live value twice (time to live is discussed below). Alternatively the router may not decrement the time to live at all or it may perform other unexpected operations. The operations for confirming the proximity estimate are described in greater detail below, in the description of FIG. 7.

At block 416, the routing request agent determines whether the proximity is the same as the previous proximity determination. If the proximity is the same as the previous determination, the process continues at block 418. Otherwise the process continues at block 420. At block 418, the routing request agent 110 waits. In one embodiment, if the number of messages cannot be optimized, the request routing agent only determines proximity twice in one hour. As such, if the routing request agent has determined proximity twice before an hour has elapsed, it waits for the remainder of the hour to elapse before performing additional proximity estimates. The process continues at block 408. At block 420, the request routing agent 110 reports its proximity determination to the request routing server 108.

Figure 5:
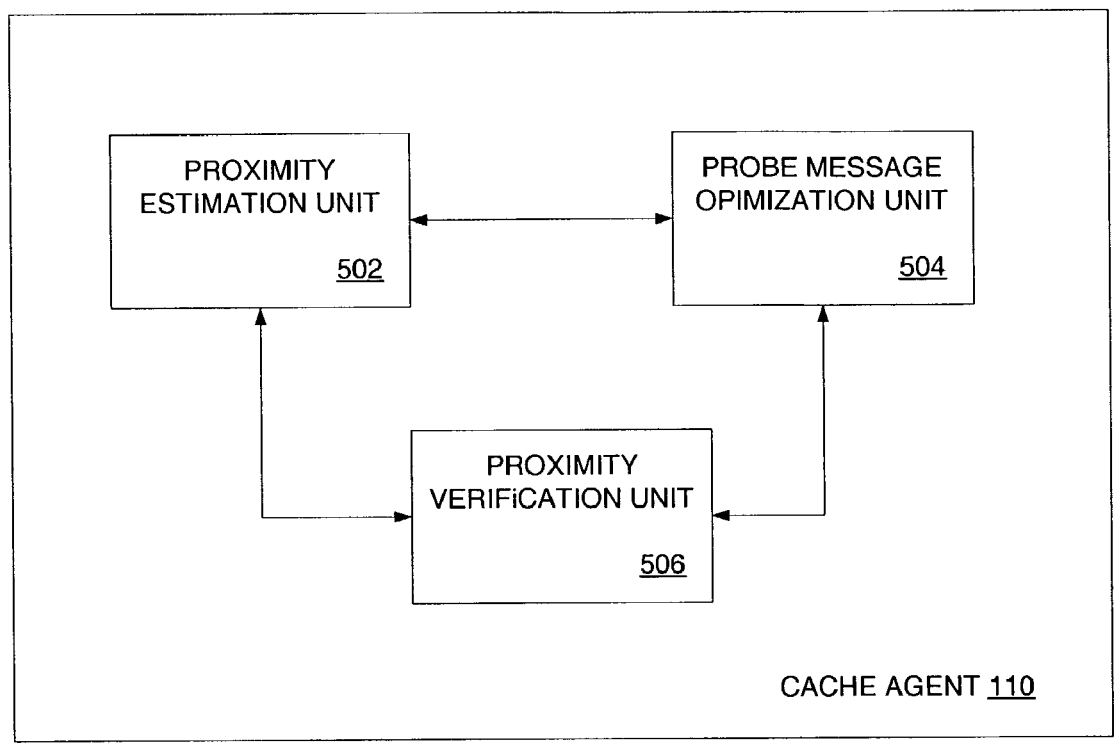
FIG. 5 is a block diagram illustrating a request routing agent, according to embodiments of the invention.
Figure 6:
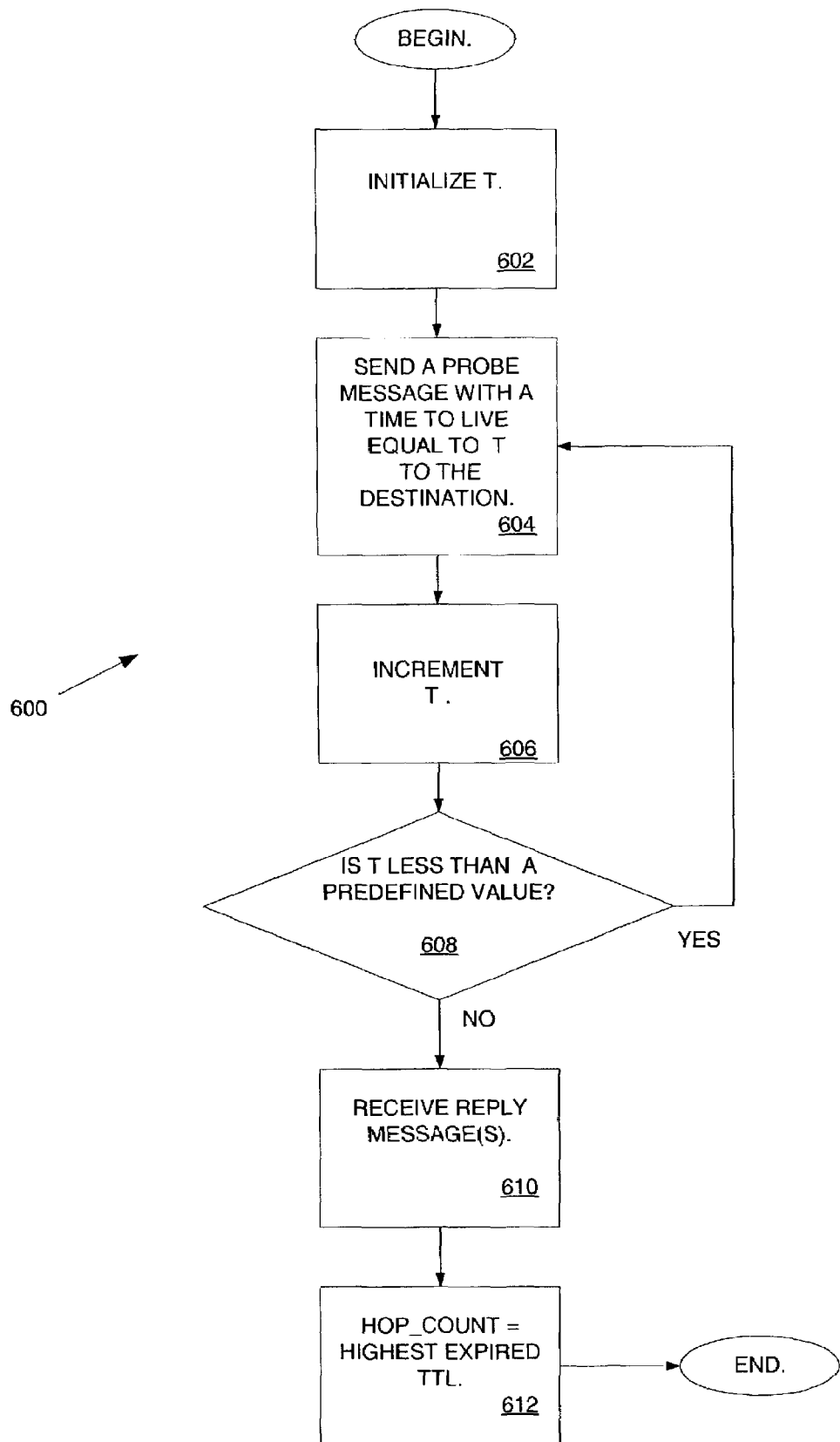
FIG. 6 is a flow diagram illustrating operations of a proximity estimation unit, according to embodiments of the invention.
Figure 7:
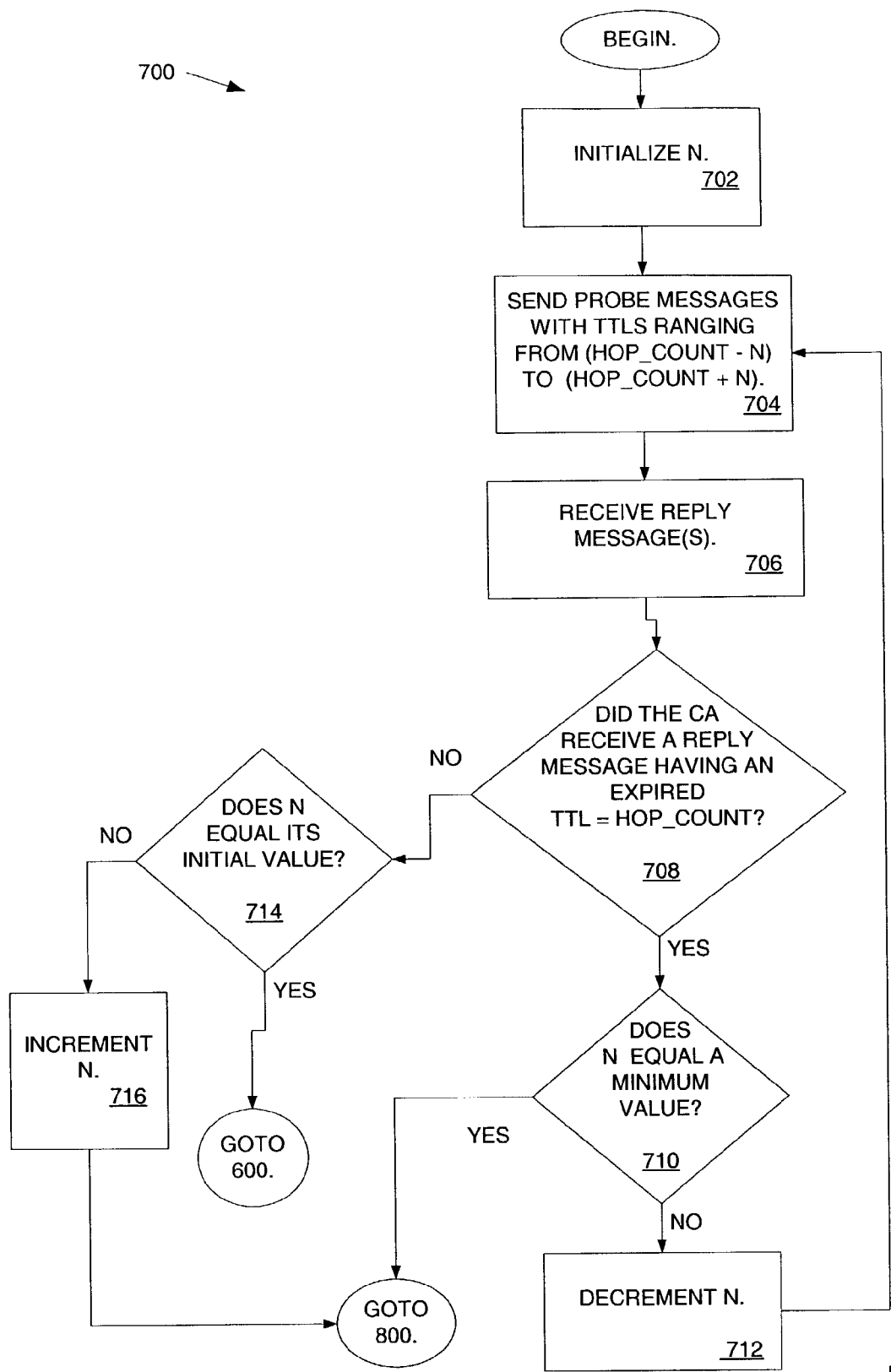
FIG. 7 is a flow diagram illustrating operations of a probe message optimization unit, according to embodiments of the invention.
Figure 8:
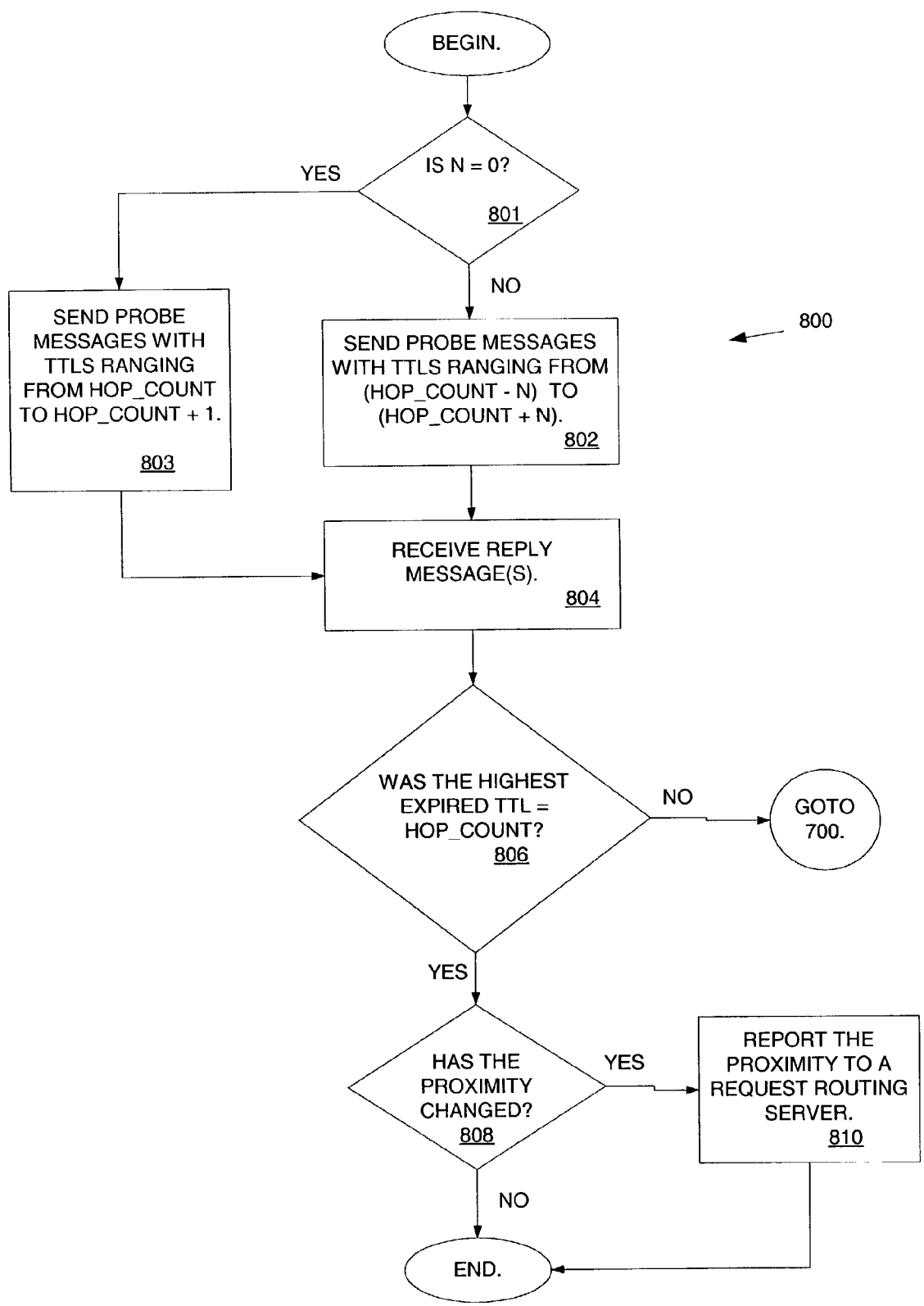
FIG. 8 is a flow diagram illustrating operations of a proximity verification unit, according to embodiments of the invention.

As the discussion of FIGS. 4A and 4B has described the operations for determining the proximity between network elements, the following discussion of FIGS. 6-8 describe certain of these operations in greater detail. The following discussion of FIG. 5 further describes a request routing agent 10.

FIG. 5 is a block diagram illustrating a request routing agent, according to embodiments of the invention. In FIG. 5, the request routing agent 110 includes a proximity estimation unit 502 coupled to a probe message optimization unit 504 and a proximity verification unit 506. In one embodiment the units are fully connected (i.e., each unit is directly connected to all other units). In embodiments of the invention, these units (502, 504, and 506) may be various processors, application specific integrated circuits (ASICs), memories, and/or machine-readable media for performing operations according to embodiments of the invention. Machine-readable media includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc. In one embodiment, the units shown in FIG. 5 are machine-readable media executing on a processor to carryout the operations described herein. However, in alternative embodiments, the units of FIG. 5 are other types of logic (e.g., digital logic) for executing the operations described herein. The operations of these units will be described in further detail below, in the descriptions of FIGS. 6-8.

The aforementioned units included in request routing agent 110 may be combined and/or further separated, according to embodiments of the invention. For example, in one embodiment, the proximity estimation unit 502 is combined with the probe message optimization unit 504. As another example, in one embodiment, the probe message optimization unit 504 is combined with the proximity verification unit 506. As yet another example, in an embodiment, the proximity estimation unit 502 is divided into two separate units; one unit for sending probe messages and another unit for receiving reply messages.

As shown in FIG. 5, the units are connected and capable of communicating with each other. In one embodiment, when a unit completes its operations (the operations of each unit are shown below in FIGS. 6-8), the unit can pass parameters and/or data to another unit. Upon receiving the parameters and/or data, the other unit may perform its operations using the parameters and/or data. According to embodiments of the invention, the parameters and/or data may be in the form of electrical signals, software pointers, and/or other binary data.

As indicated above, FIGS. 6-8 are more detailed descriptions of certain operations of FIGS. 4A and 4B.

FIG. 6 is a flow diagram illustrating operations of a proximity estimation unit, according to embodiments of the invention. The flow diagram 600 will be described with reference to the exemplary CDN segment of FIG. 2 and the exemplary request routing agent 110 of FIG. 5. As shown in FIG. 6, the flow diagram 600 commences at block 602, wherein the proximity estimation unit 502 initializes a counter T to a predetermined value (e.g., T=1). The process continues at block 604. At block 604, the proximity estimation unit 502 sends to a request routing agent 110 a probe message with a time to live (TTL) equal to T. The process continues at block 606.

A probe message's time to live represents a maximum number of hops that the probe message may travel toward its destination. Typically, whenever a router (or other network element) receives the probe message, the router decrements the probe message's TTL value. For example, referring to FIG. 2, assume the request routing agent 110 sends a probe message with a TTL=2 to the client agent 104. The probe message will travel to router 1, where router 1 decrements the probe message's TTL value (now the probe message's TTL=1). Router 1 forwards the probe message to router 2, which decrements the probe message's TTL value to 0. Typically, whenever a router (or other network element) decrements a probe message's TTL to 0, it sends a reply message back to the probe message's source (e.g., the request routing agent 110). Included in the probe message, is an expired TTL value. For example, this reply message's expired TTL value is 2.

As shown in block 606, the proximity estimation unit 502 increments T. For example, if T were equal to 1, the proximity estimation unit 502 would increase T's value to 2. The process continues at block 608. At block 608, the proximity estimation unit 502 determines whether T is less than a predetermined value. In one embodiment the predetermined value is 30. In alternative embodiments, the predetermined value is a greater or lesser number. If T is less than the predetermined value, the process continues at block 604. Otherwise the process continues at block 610.

At block 610, the proximity estimation unit 502 receives a reply message(s). For example, in one embodiment, the proximity estimation unit 502 receives a number of reply messages for probe messages whose TTLs expired. The process continues at block 612. At block 612, the proximity estimation unit 502 assigns the value of the highest expired TTL to a variable hop_count. For example, the proximity estimation unit 502 examines each reply message's expired TTL value and assigns the highest expired TTL value to hop_count. In one embodiment, hop_count equals the number of hops between the request routing agent 110 and a firewall. For example, referring to FIG. 2, hop_count could equal the number of hops between the request routing agent 110 and the firewall of router 5 (hop_count=5). As indicated above, firewalls typically drop probe messages. As a result, probe messages destined for the client agent 104 may be dropped by the firewall of router 5, even though router 5 returns a reply message for the probe message having TTL=5. Therefore, after sending probe messages with TTLs as high as 30 (in the operations of blocks 602-608), the proximity estimation unit 502 may receive reply messages having a highest expired TTL=5. In one embodiment, these results lead the request routing agent 110 to assume the network element 5 hops away is a firewall. The request routing agent 110 makes this assumption because it would have received reply messages with higher expired TTLs if a firewall (or other network layer filter) were not dropping the probe messages. In one embodiment the request routing agent uses the proximity to the firewall as its estimate of proximity to the client agent 104. After block 612, the process ends. In one embodiment, the proximity estimation unit 502 estimates the proximity between network elements at a rate of not more than twice in one hour. Therefore, in response to performing a second proximity estimate within one hour, the proximity estimation unit 502 may wait before performing additional proximity estimates. For example, if the proximity estimation unit 502 performs two proximity estimates within a half-hour, it waits another half-hour before performing additional proximity estimates.

FIG. 7 is a flow diagram illustrating operations of a probe message optimization unit, according to embodiments of the invention. The flow diagram 700 will be described with reference to the exemplary request routing agent 110 of FIG. 5. In one embodiment, the operations shown in FIG. 7 are a more detailed description of certain operations of FIGS. 4A and/or 4B. In an embodiment, the probe message optimization unit 504 receives the value of the variable hop_count from the proximity estimation unit 502, upon the proximity estimation unit's completion of the operations of FIG. 6. The probe message optimization unit 504 uses this hop_count value in its operations.

As shown in FIG. 7, the flow diagram 700 commences at block 702, wherein the probe message optimization unit 504 initializes a variable N to a predetermined value. In one embodiment the predetermined value is 3. However, in alternative embodiments of the invention, the predetermined value is larger or smaller than 3. The process continues at block 704. At block 704, the probe message optimization unit 504 sends probe messages with TTLs ranging from (hop_count−N) to (hop_count+N). For example, if (hop_count=5) and (N=3), the probe message optimization unit 504 sends 7 probe messages. More specifically, the probe message optimization unit 504 sends one probe message with a TTL=2, another with TTL=3, another with TTL=4, and so on, until it sends a probe message with TTL=8. The process continues at block 706. At block 706, the probe message optimization unit 504 receives reply message(s). For example, in one embodiment, the probe message optimization unit 504 receives a number of reply messages for probe messages whose TTLs expired, as described above in the description of FIG. 6. The process continues at block 708.

As shown in block 708, the probe message optimization unit 504 determines whether the highest expired TTL is equal to the hop_count. That is, the probe message optimization unit 504 determines whether it has achieved the same results as the proximity estimation unit 502, but by sending fewer probe messages. If the probe message optimization unit 504 did not receive a reply message including an expired TTL=hop_count, the process continues at block 714. Otherwise, the process continues at block 710.

At block 714, the request routing agent 110 determines whether N is equal to its initial value. If N is not equal to its initial value, the process continues at block 716. Otherwise the process continues with flow diagram 600 of FIG. 6, which is described in more detail above. At block 716, the request routing agent 110 increments N. In one embodiment, the request routing agent 110 increments the value of N to what it was on the last successful confirmation of the estimated proximity. For example, if for (N=3) the request routing agent 110 received a reply message having an expired TTL=hop_count, but for (N=2) it did not, the request routing agent 110 would increment N to 3. In one embodiment, N is incremented because the proximity verification unit 506 will use it. After block 716, the process continues with flow diagram 800 of FIG. 8, which is described in more detail below.

At block 710, the probe message optimization unit 504 determines whether the variable N equals a minimum value. In one embodiment, the minimum value is 1, but in other embodiments it is a larger or smaller value. If N equals the minimum, the process continues with flow diagram 800 of FIG. 8, which is described in more detail below. Otherwise the process continues at block 712. At block 712, the probe message optimization unit 504 decrements the value of N. In one embodiment, the probe message optimization unit 504 decrements the value of N by 1. In alternative embodiments, the probe message optimization unit 504 decrements the value of N by more than one. The process continues at block 704. As the process continues, the probe message optimization unit 504 reduces the number of probe messages that it sends. Therefore, the probe message optimization unit 504 allows the request routing agent 110 to verify its proximity to the firewall or client agent 104 by sending fewer probe messages than it did when estimating proximity. Sending fewer probe messages allows for a faster determination of proximity and reduces the likelihood that a network element will construe the probe messages as an attack (e.g., an attempt to compromise the network element's security).

FIG. 8 is a flow diagram illustrating operations of a proximity verification unit, according to embodiments of the invention. The flow diagram 800 will be described with reference to the exemplary request routing agent 110 of FIG. 5. In one embodiment, the operations shown in FIG. 8 are a more detailed description of certain operations shown in FIGS. 4A and/or 4B. In an embodiment, the proximity verification unit 504 receives the variable values of hop_count and N from the probe message optimization unit 504, upon the probe message optimization unit's completion of the operations of FIG. 7. In one embodiment, the proximity verification unit 506 uses the values of hop_count and N in performing its operations.

As shown in FIG. 8, the flow diagram 800 commences at block of 801, wherein the proximity verification unit 506 determines whether N is equal to zero. If N is not equal to zero, the process continues at block 802. Otherwise the process continues at block 803. At block 802, the proximity verification unit 506 sends probe messages with TTLs ranging from (hop_count−N) to (hop_count+N). At block 803, the proximity verification unit 506 sends probe messages with times to live ranging from hop_count to hop_count+1. The process continues at block 804. At block 804 the proximity verification unit 506 receives reply message(s). In one embodiment, each reply message includes an expired TTL value, as described above. The process continues at block 806. At block 806, the proximity verification unit 506 determines whether the highest expired TTL value of the reply messages equals hop_count. That is, the proximity verification unit 506 determines whether it has achieved the same result as the proximity estimation unit 502, but by sending an optimized number of probe messages. If the highest expires TTL is equal to the hop_count, the process continues at block 808. Otherwise the process continues at flow diagram 700, which is described above. At block 808, the proximity verification unit 506 determines whether the proximity has changed. For example, the proximity verification unit 506 compares the current expired TTL value to the previous proximity measurement. If the proximity has changed, the process continues at block 810. Otherwise the process ends. However, in one embodiment, the process continues at block 802, as described below with reference to block 810.

As shown in block 810, the proximity verification unit 506 reports the proximity between the client agent 104 and the request routing agent 110 to a request routing server. For example, the proximity verification unit 506 sends a message including the proximity to a request routing server 108. In one embodiment the determined proximity between the request routing agent 110 and the client agent 104 is equal to that between the request routing agent 110 and a network layer filter. From block 810, the process ends. However, in one embodiment, the process continues at block 802. In one embodiment, the proximity verification unit 506 verifies the proximity between network elements at a rate of not more than twice in one hour. Therefore, in response to performing a second proximity verification within one hour, the proximity verification unit 506 may wait before performing additional proximity verifications.

The operations of the proximity verification unit 506 allow the request routing agent 110 to determine its proximity to a client agent 104 by sending fewer messages than were sent by the proximity estimation unit 502. As shown in FIG. 4, once the proximity has been estimated and optimized, subsequent attempts to verify the proximity may be determined by sending an optimized number of probe messages.

Figure 9:
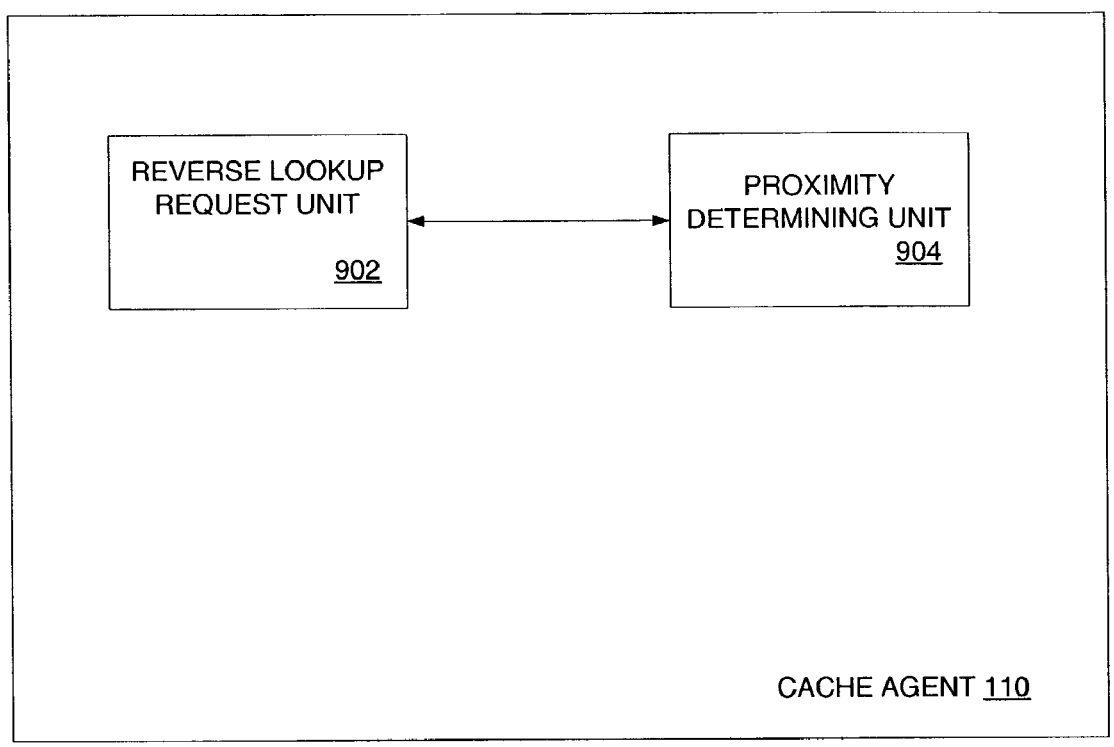
FIG. 9 illustrates a block diagram of a request routing agent that performs address lookups, according to embodiments of the invention.

FIG. 9 illustrates a block diagram of a request routing agent that performs reverse address lookups, according to embodiments of the invention. The request routing agent of FIG. 9 includes a reverse lookup request unit 902 connected to a proximity determination unit 904. The reverse lookup request unit 902 sends reverse lookup requests to client agents 104. In one embodiment some of the client agents are local domain name servers and/or other network elements. The proximity determination unit 902 determines the proximity between network elements based on replies to the reverse lookup requests. These units may be coupled with other units described above in the description of FIG. 5. For example, the reverse lookup request unit 902 and/or the proximity determination unit 904 may be coupled with the proximity estimation unit 502, probe message optimization unit 504, and/or proximity verification unit 506. Just like the units of FIG. 5, these units (902 and 904) may be various processors, application specific integrated circuits (ASICs), memories, and/or machine-readable media for performing operations according to embodiments of the invention. Just like the units of FIG. 5, these units may be further divided or combined.

Figure 10:
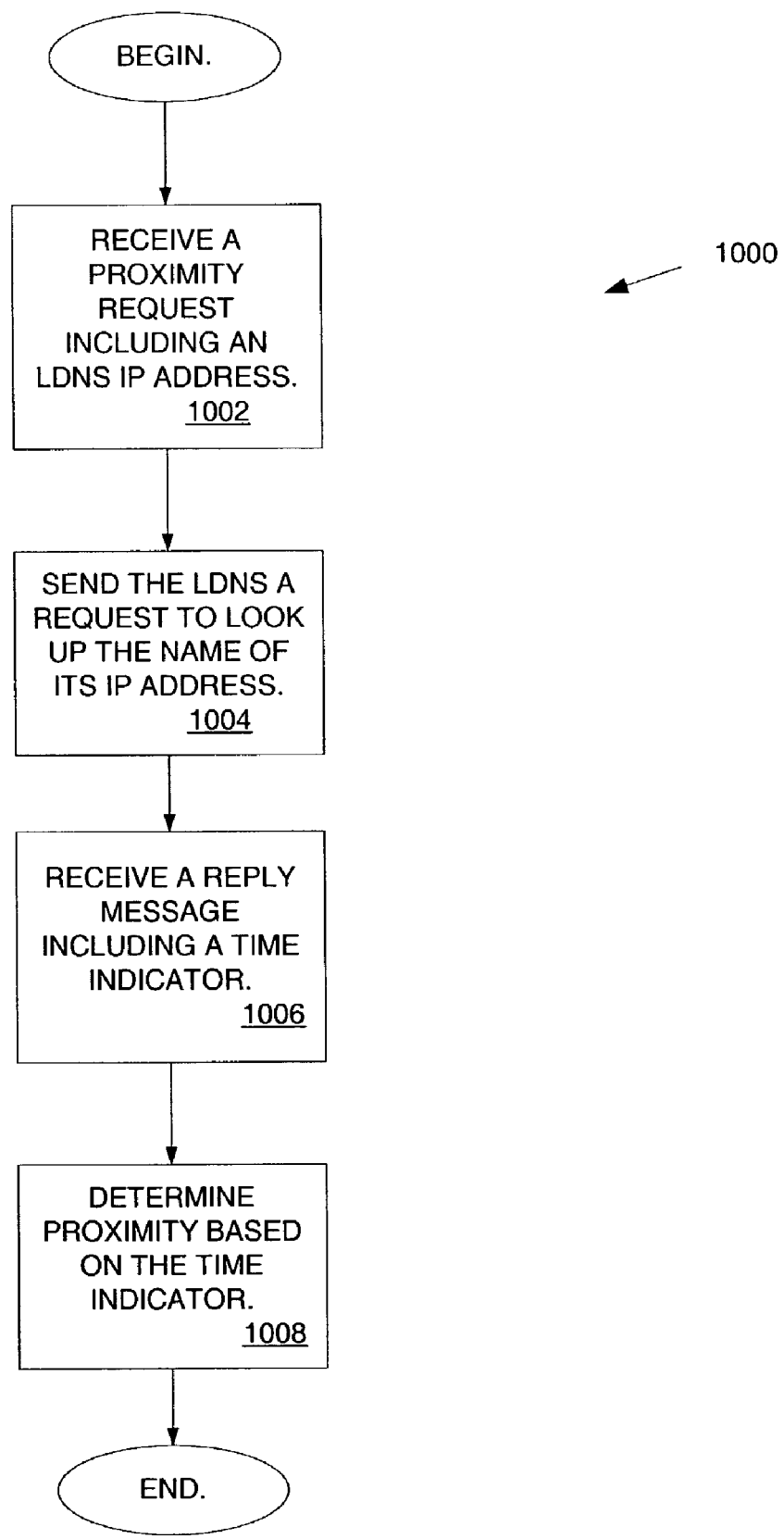
FIG. 10 is a flow diagram for determining the proximity of network elements by performing address lookups, according to embodiments of the invention.

FIG. 10 is a flow diagram for determining the proximity of network elements by performing reverse address lookups, according to embodiments of the invention. The operations shown in FIG. 10 are a more detailed description of the operation shown in block 306 of FIG. 3. The flow diagram of FIG. 10 will be described with reference to the exemplary request routing agent of FIG. 9. As shown in FIG. 10, flow diagram 1000 commences at block 1002, wherein a request routing agent 110 receives a proximity request including a client agent IP address. For example, a request routing agent 110 receives a request from a request routing server 108 to determine the request routing agent's proximity to a particular client agent 104 specified by an IP address included with the request message. In one embodiment, the client agent is a local domain name server. The process continues at block 1004. At block 1004, the reverse lookup request unit 902 sends the client agent 104 a request to lookup the name of its IP address. In one embodiment, the reverse lookup request unit 902 sends the client agent 104 a request to lookup a name associated with an IP address that was included in the request routing server's proximity request. That is, the lookup request unit 902 requests that the client agent 104 lookup a name associated with its own IP address. In response to the request routing agent's reverse lookup request, the client agent 104 sends a reply message back to the request routing agent 110. The process continues at block 1006.

At block 1006, the reverse lookup request unit 902 receives a reply message including a time indicator. For example, in one embodiment, the reverse lookup requesr unit 902 receives a reply to the IP lookup request including a time stamp indicating when the client agent 104 transmitted the reply to the request routing agent 110. In an alternative embodiment, the time indicator indicates the elapsed from when the reply was sent by the client agent 104 to when it was received by the request routing agent 110. The process continues at block 1008. At block 1008, the proximity determination unit 902 determines the proximity based on the time indicator. In one embodiment, the proximity determination unit 902 determines that the proximity between the request routing agent 110 and the client agent 104 is equal to the time indicator. However, in an alternative embodiment, the proximity determination unit 902 determines the proximity as a function of the time indicator value (e.g., proximity is the time indicator minus some predefined number). From block 1008, the process ends.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus comprising:
    a processor to execute instructions that implement:
    a proximity estimation unit to send a first number of probe messages to a client agent without waiting to receive a reply message, the proximity estimation unit to receive a first set of reply messages including a largest expired time to live (TTL) value of the first set, and to determine a proximity estimate from the largest expired TTL value of the first set; and
    a proximity verification unit coupled with the proximity estimation unit, to use the proximity estimate to set a TTL value in each of a second number of probe messages, to send the second number of probe messages including the largest expired TTL value of the first set, to the client agent, to receive a second set of reply messages including a largest expired TTL value of the second set, and to verify that the largest expired TTL value of the first set equals the largest expired TTL value of the second set, wherein the second number is smaller than the first number, so that the proximity estimate can be verified by sending a smaller number of probe messages than the number of probe messages that was sent to determine the proximity estimate.

2. The apparatus of claim 1, wherein the proximity estimation unit estimates a proximity between a client agent and a request routing agent.

3. The apparatus of claim 2, wherein the proximity is published to a request routing server.

4. The apparatus of claim 1, wherein the first number is a predefined value, and the second number is based on a information included in the second set of reply messages.

5. A method comprising:
    estimating a proximity, the estimating including
        sending a first number of probe messages to a client agent without waiting to receive a reply message,
        receiving a first set of reply messages including a largest expired time-to-live (TTL) value of the first set, and determining a proximity estimate from the largest expired TTL value of the first set;

verifying the proximity, the verifying including using the proximity estimate to set a TTL value in each of a second number of probe messages, sending the second number of probe messages, including a largest expired TTL value of the first set, to the client agent, wherein the second number is less than the first number, receiving a second set of reply messages, including a largest expired TTL value of the second set, and verifying that the largest expired TTL value of the first set equals the largest expired TTL value of the second set, so that the proximity estimate can be verified by sending a number of probe messages that is less than the number of probe messages that was sent to determine the proximity estimate.

6. The method of claim 5, wherein the proximity is between a request routing agent and a firewall.

7. The method of claim 5 wherein the proximity is between a request routing agent and the client agent.

8. The method of claim 5, wherein each of the first number of probe messages is assigned a different time to live (TTL) value ranging from 1—to a predefined value.

9. The method of claim 5 further comprising:

publishing the proximity in a table.

10. An apparatus comprising:

a processor to execute instructions that implement:

a proximity estimation unit to send a first number of probe messages and to receive a first set of reply messages including a largest expired time-to-live (TTL) value of the first set, the proximity estimation unit to determine a proximity estimate between a request routing agent and a client agent from the largest expired TTL value of the first set;

a probe message optimization unit coupled with the proximity estimation unit, to determine an optimized sequence of TTL values to be sent in an optimized number of probe messages, the optimized number being smaller than the first number, the optimized sequence of TTL values including the largest expired TTL value of the first set as a center value of the sequence; and a proximity verification unit coupled with the proximity estimation unit and the probe message optimization unit, to use the proximity estimate to set a time to live (TTL) value in each of the optimized number of probe messages, to send the optimized number of messages to the client agent, to receive a second set of reply messages including a largest expired TTL value of the second set, and to verify that the largest expired TTL value of the first set equals the largest expired TTL value of the second set, so that the proximity estimate can be verified by sending a smaller number of probe messages than the number of probe messages that was sent to determine the proximity estimate.

11. The apparatus of claim 10, wherein the proximity estimation unit sends the probe messages to the client agent without waiting to receive any of the first set of reply messages, each of the probe messages having a different time to live (TTL).

12. The apparatus of claim 11, wherein the probe message optimization unit determines the optimized number of probe messages based on a highest expired TTL value of probe messages received by the proximity estimation unit.

13. The apparatus of claim 10, wherein the first number is a predefined value and the optimized number is based on information included in the second set of reply messages.

14. A network comprising:

a request routing agent serving network content, the request routing agent including a processor to execute instructions that implement:

a proximity estimation unit to send a number of probe messages to a client agent, to receive a first set of reply messages including a largest expired TTL value of the first set, and to determine a proximity estimate from the first set of reply messages from the largest expired TTL value of the first set;

a probe message optimization unit coupled with the proximity estimation unit, to determine an optimized sequence of TTL values to be sent in an optimized number of probe messages, the optimized number being smaller than the first number, the optimized sequence of TTL values including the largest expired TTL value of the first set as a center value of the sequence; and a proximity verifying unit coupled with the proximity estimation unit and the probe message optimization unit, to use the proximity estimate to set a time to live (TTL) value in each of the optimized number of probe messages, to send the optimized number of probe messages, to receive a second set of reply messages including a largest expired TTL value of the second set, and to verify that the largest expired TTL value of the first set equals the largest expired TTL value of the second set, so that the proximity estimate can be verified by sending a smaller number of probe messages than the number of probe messages that was sent to determine the proximity estimate; and the client agent including a processor to execute instructions that implement processing network content requests.

15. The network of claim 14, further comprising:

a network layer filter dropping probe messages that are destined to the client agent.

16. The network of claim 14, wherein the proximity estimation unit sends the number of probe messages to the client agent without waiting to receive one of the first set of reply messages, wherein each probe message has a different TTL.

17. A method comprising:

sending a first number of messages to a client agent without waiting to receive a reply message;

receiving a first set of reply messages, the first set including a largest expired time to live (TTL) value of the first set;

estimating proximity based on the largest expired TTL value of the first set;

setting a TTL value in each of a second number of probe messages, wherein the second number of probe messages includes an optimized sequence of TTL values having the largest expired TTL value of the first set as a center value of the sequence, the second number being smaller than the first number;

sending the second number of probe messages to the client agent;

receiving a second set of reply messages, the second set including a largest expired TTL value of the second set; and verifying that the largest expired TTL value of the first set equals the largest expired TTL value of the second set, so that the estimated proximity can be verified by sending a smaller number of probe messages than the number of probe messages that was sent to estimate the proximity.

18. The method of claim 17, wherein the proximity is between the client agent and a request routing agent.

19. The method of claim 17, wherein the proximity is between a firewall and a request routing agent.

20. A method comprising:
sending a first number of probe messages to a client agent, each of the probe messages including a time to live (TTL) value;
receiving a first set of reply messages including a largest expired TTL value for the first set;
using the largest expired TTL value for the first set to set a TTL value in a second number of probe messages, wherein the second number of probe messages includes the largest expired TTL value of the first set, the second number being smaller than the first number;
sending the second number of probe messages;
receiving a second set of reply messages including a largest expired TTL value for the second set;
determining whether the largest expired TTL value for the second set is equal to the largest expired TTL value for the first set;
in response to determining the largest TTL value for the second set is equal to the largest TTL value for the first set, sending a third number of probe messages, each probe message including a TTL value from a second range of TTL values;
receiving a third set of reply messages, the third set of reply messages including a largest expired TTL value for the third set;
determining whether the largest expired TTL value for the third set is equal to the largest expired TTL value for the first set;
in response to determining the largest expired TTL value for the third set is equal to the largest expired TTL value for the first set, indicating a proximity.

21. The method of claim 20, wherein the second number is equal to the third number.

22. The method of claim 20, wherein the range is from one less than to one more than the largest expired TTL for the first set to one.

23. The method of claim 20, wherein the proximity is between the client agent and a request routing agent.

24. The method of claim 20, wherein the proximity is between a firewall and a request routing agent.

25. A machine-readable storage medium that provides instructions, which when executed by a machine, cause said machine to perform operations comprising:
estimating a proximity, the estimating including,
sending a first number of probe messages to a client agent without waiting to receive a reply message,
receiving a first set of reply messages, and
determining a proximity estimate from the first set of reply messages;
verifying the proximity, the verifying including,
using the proximity estimate to set a time to live (TTL) value in a second number of probe messages,
sending the second number of probe messages to the client agent, wherein the second number of probe messages includes the largest expired TTL value of the first set, the second number being less than the first number,
receiving a second set of reply messages including a largest expired TTL value of the second set, and
verifying that the largest expired TTL value of the first set equals the largest expired TTL value of the second set,
so that the proximity estimate can be verified by sending a number of probe messages that is less than the number of probe messages that was sent to determine the proximity estimate.

26. The machine-readable storage medium of claim 25, wherein the proximity is between a request routing agent and a firewall.

27. The machine-readable storage medium of claim 25, wherein the proximity is between a request routing agent and the client agent.

28. The machine-readable storage medium of claim 25, wherein each of the first number of probe messages is assigned a different TTL value ranging from 0 to a predefined value.

29. The machine-readable storage medium of claim 25 that provides instructions, which when executed by a machine, cause said machine to perform operations further comprising:
publishing the proximity in a table.

30. A system for directing a client agent to a nearest request routing agent among a plurality of request routing agents on a network, the system comprising:
a plurality of request routing agents, each including a processor to execute instructions that:
estimate a proximity of the request routing agent to the client agent, by sending a first number of probe messages to the client agent without waiting to receive a reply message;
verify the proximity of the request routing agent to the client agent, by sending a second number of probe messages to the client agent without waiting to receive a reply message, the second number being less than the first number, so that the proximity can be verified by sending a number of probe messages that is less than the number of probe messages that was sent to estimate the proximity; and
report the verified proximity to a request routing server;
a request routing server including a processor to execute instructions that:
receive verified proximities from the plurality of request routing agents,
based on the received proximities, determine which of the plurality of request routing agents is nearest to the client agent, and
direct the client agent to the determined routing agent.

* * * * *